(12) United States Patent
Desorcie et al.

(10) Patent No.: US 8,925,354 B2
(45) Date of Patent: Jan. 6, 2015

(54) METHODS FOR FORMING AN OVERCLAD PORTION OF AN OPTICAL FIBER FROM PELLETIZED GLASS SOOT

(75) Inventors: Robert Brett Desorcie, Painted Post, NY (US); Peter Joseph Ronco, Horseheads, NY (US); Roger A. Rose, Painted Post, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 382 days.

(21) Appl. No.: 12/612,127

(22) Filed: Nov. 4, 2009

(65) Prior Publication Data

US 2011/0100063 A1    May 5, 2011

(51) Int. Cl.
*C03B 37/028* (2006.01)
*C03B 37/012* (2006.01)
*C03B 37/027* (2006.01)

(52) U.S. Cl.
CPC ....... *C03B 37/0124* (2013.01); *C03B 37/01282* (2013.01); *C03B 37/02754* (2013.01); *C03B 2205/13* (2013.01)
USPC .................................. 65/412; 65/416; 65/417

(58) Field of Classification Search
CPC ..................... C03B 37/0124; C03B 37/02754; C03B 37/01282; C03B 2205/13
USPC ........................................... 65/412, 416, 427
See application file for complete search history.

(56) References Cited

U.S. PATENT DOCUMENTS

| | | | |
|---|---|---|---|
| 3,187,422 A | 6/1965 | Morgan | 29/419 |
| 3,532,480 A | 10/1970 | D'Eustachio | 65/20 |
| 4,252,754 A | 2/1981 | Nakaguchi et al. | 264/12 |
| 5,762,847 A | 6/1998 | Kamps et al. | 264/140 |
| 6,047,568 A * | 4/2000 | Campion | 65/395 |
| 2002/0069677 A1 | 6/2002 | Berkey | 65/403 |
| 2004/0172980 A1* | 9/2004 | Hazan et al. | 65/397 |
| 2006/0115913 A1* | 6/2006 | Orita et al. | 438/22 |
| 2007/0214841 A1* | 9/2007 | Pedrido | 65/477 |
| 2007/0220924 A1 | 9/2007 | Pedrido | 65/507 |
| 2009/0126408 A1 | 5/2009 | Bookbinder et al. | 65/415 |

FOREIGN PATENT DOCUMENTS

WO    WO2005/102947    11/2005 ............ C03B 37/012

OTHER PUBLICATIONS

Tandon, Pushkar et al, "Predicting Heat and Mass Transfer to a Growing, Rotating Preform During Soot Deposition in the Outside Vapor Deposition Process", Chemical Engineering Science, 60, (2005), pp. 5118-5128.

(Continued)

*Primary Examiner* — Queenie Dehghan
(74) *Attorney, Agent, or Firm* — Matthew J. Mason; Brian A. Tent

(57) ABSTRACT

Methods of forming an overclad portion of an optical fiber are described which include positioning a core cane member in an overclad tube to form a rod and tube assembly. Thereafter, glass soot pellets are positioned in the rod and tube assembly between the core cane member and an interior sidewall of the overclad tube. The rod and tube assembly is then redrawn under conditions effective to form the overclad tube and the glass soot pellets into a continuous, void-free glass layer surrounding the core cane member at a sintering time $t_{sinter}$ of at least 1800 seconds thereby forming an overclad portion of an optical fiber.

14 Claims, 3 Drawing Sheets

(56) References Cited

OTHER PUBLICATIONS

Tandon, Pushkar et al, "Experimental and Theoretical Studies of Flame Hydrolysis Deposition Process for Making Glasses for Optical Planar Devices", Journal of Non-Crystalline Solids 317, (2003), pp. 275-289.

Tandon, Pushkar, Éffect of Stress on the Structural Relaxation Behavior of Glasses, Journal of Non-Crystalline Solids, 351, (2005), pp. 2210-2216.

International Search Report and Written Opinion mailed Dec. 29, 2010 for PCT/US2010/055212 filed Nov. 3, 2010.

Chinese Office Action and Search Report dated Jan. 30, 2014 for CN Patent Application No. 201080050500.6.

* cited by examiner

METHODS FOR FORMING AN OVERCLAD PORTION OF AN OPTICAL FIBER FROM PELLETIZED GLASS SOOT

BACKGROUND

1. Field

The present specification generally relates to optical fibers and, more specifically, to methods for making optical fiber preforms utilizing glass soot.

2. Technical Background

The cladding portion of an optical fiber preform may be formed by depositing glass soot onto a target, such as a glass core cane or glass cylinder, with an outside vapor deposition (OVD) process, a modified chemical vapor deposition process (MCVD) or an axial vapor deposition (AVD) process. For example, the glass soot may be generated by the pyrolysis of silicon tetrachloride, octamethyltetrasiloxane or a similar vapor phase precursor material. These deposition processes are highly optimized, high yield manufacturing processes. However, the formation of the cladding layer is often the rate limiting step in maximizing optical fiber output. Further, less than 100% of the pyrolysis product of the octamethyltetrasiloxane feedstock is deposited on the target during deposition of the cladding portion of the optical fiber preform. The remaining pyrolysis product of the octamethyltetrasiloxane feedstock is collected in a baghouse as relatively high purity silica glass soot.

In order to further improve optical fiber output and reduce raw material costs, alternative methods of forming the cladding portions of optical fibers are needed.

SUMMARY

According to one embodiment, a method of forming an overclad portion of an optical fiber includes forming a rod and tube assembly by positioning a core cane member in an overclad tube. Thereafter, pelletized glass soot is positioned between the core cane member and an interior sidewall of the overclad tube. The rod and tube assembly is then redrawn under conditions effective to form the overclad tube and the pelletized glass soot into a continuous, substantially void-free glass layer surrounding the core cane member at a sintering time $t_{sinter}$ of at least 1800 seconds thereby forming an overclad portion of an optical fiber.

In another embodiment, a method of forming an overclad portion of an optical fiber includes forming a rod and tube assembly by positioning a core cane member in an overclad tube. Thereafter, pelletized glass soot is positioned between the core cane member and an interior sidewall of the overclad tube. The pelletized glass soot comprises pellets with an average equivalent spherical diameter $D_P$ of at least 0.3 mm. The rod and tube assembly is then redrawn at a sintering time $t_{sinter}$ of at least 1800 seconds at a sintering temperature $T_{redraw}$ of at least 1700° C. such that the overclad tube and the glass soot pellets form a continuous, void-free glass layer surrounding the core cane member.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION OF THE PREFERRED EMBODIMENTS

Figure 1:
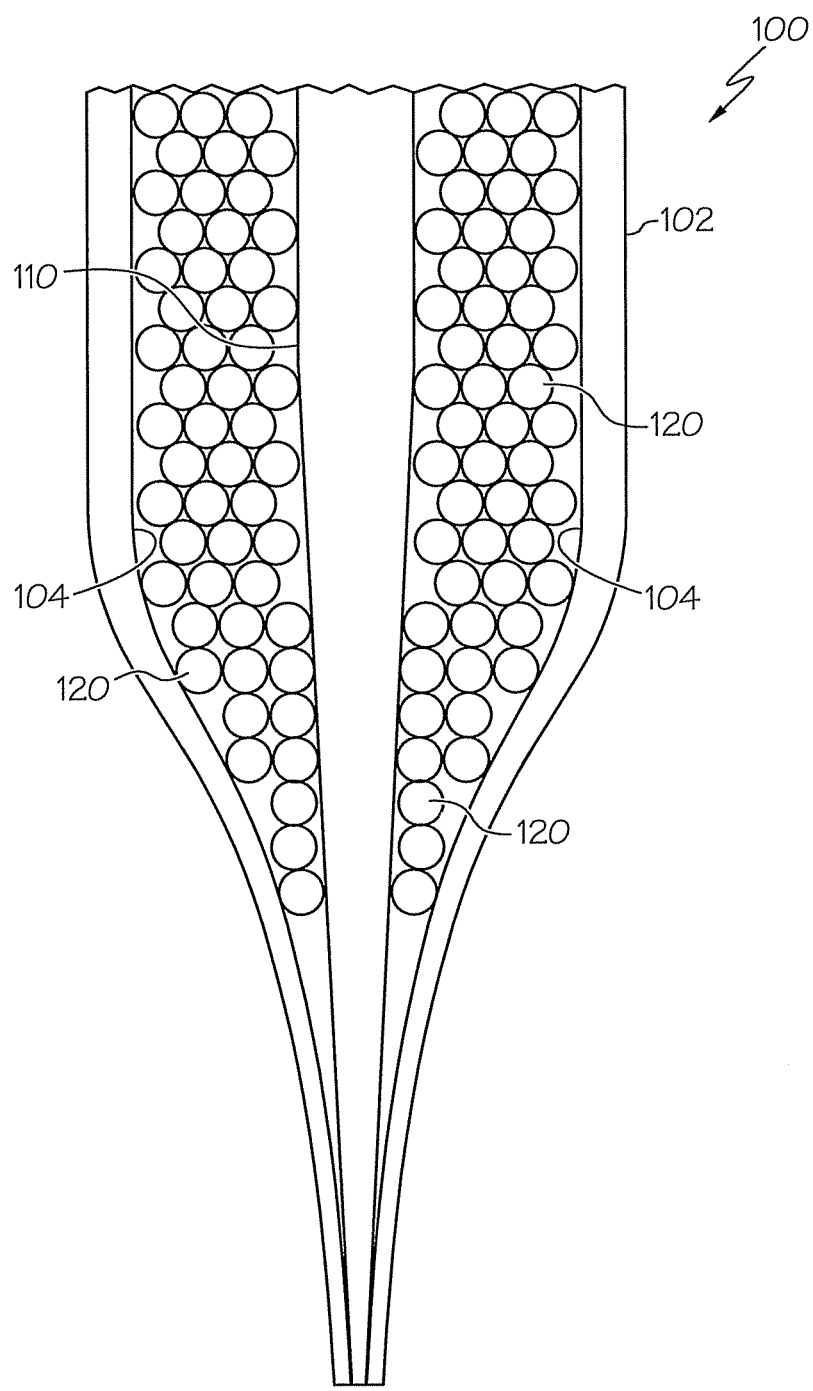
FIG. 1 depicts a portion of a rod and tube assembly according to one or more embodiments of the method for forming a cladding portion of an optical fiber shown and described herein.

Reference will now be made in detail to various embodiments of the method for forming an overclad portion of an optical fiber, examples of which are illustrated in the accompanying figures. Whenever possible, the same reference numerals will be used throughout the figures to refer to the same or like parts. One embodiment of a rod and tube assembly for forming an overclad portion of an optical fiber is depicted in FIG. 1. The rod and tube assembly generally comprises an overclad tube, a core cane member and pelletized glass soot. The rod and tube assembly may be redrawn under conditions effective for forming the pelletized glass soot and the overclad tube into a continuous, void-free layer surrounding the core cane member. The rod and tube assembly and methods for drawing the rod and tube assembly to form an overclad portion of an optical fiber will be described in more detail herein.

Referring to FIG. 1, a portion of a rod and tube assembly 100 is depicted according to one embodiment of the methods for forming an overclad portion of an optical fiber described herein. The rod and tube assembly 100 comprises an overclad tube 102 and a core cane member 110. In the embodiments described herein the core cane member 110 comprises a glass rod. As shown in FIG. 1, one end of the core cane member 110 may be tapered to facilitate drawing the rod and tube assembly to a smaller diameter optical fiber preform or optical fiber, as will be described in more detail herein. In preferred embodiments described herein the core cane member 110 has a maximum diameter of about 6.9 mm. However, it should be understood that larger or smaller diameter core cane members 110 may be used with the methods described herein.

The core cane member 110 generally comprises silica glass. In one embodiment, the core cane member 110 comprises pure silica glass. The phrase "pure silica glass," as used herein, means that the silica glass does not contain material, such as dopants and/or other trace materials, in an amount which would significantly alter the refractive index of the silica glass. However, small amounts of dopants (e.g., chlorine and/or fluorine in an amount less than 1500 ppm of each) may be present in the glass which is otherwise pure silica.

Preferably, embodiments which employ a "pure silica" core cane member 110 are free from germania. Alternatively, the core cane member 110 may comprise silica glass comprising one or more dopants which increase or decrease the index of refraction of silica glass such as, for example, germania, alumina, phosphorous, titania, fluorine, boron, chlorine and/or a similar index of dopant which increases or decreases the index of refraction. In yet another alternative embodiment, the core cane member 110 may have a complex index of refraction profile, such as a step index profile or a gradient index profile, where certain portions of the core cane member have a refractive index greater than the overclad tube 102 and/or the pelletized glass soot 120 (discussed further herein) and other portions of the core cane member 110 have a refractive index less than the overclad tube 102 and/or the pelletized glass soot 120.

In the embodiments described herein, the overclad tube 102 comprises a hollow tube formed from pure silica glass or silica glass comprising one or more dopants for adjusting the index of refraction of the overclad tube. For example, when the core cane member 110 comprises silica glass up-doped with one or more dopants which increase the index of refraction of the silica glass, the overclad tube 102 may comprise pure silica glass or silica glass which comprises one or more dopants which decrease the index of refraction of silica glass, such as boron, fluorine or a similar dopant which decreases the index of refraction of silica glass, such that the index of refraction of the overclad tube is less than the index of refraction of the core cane member. Alternatively, where the core cane member 110 comprises pure silica glass, as described above, the overclad tube 102 may comprise silica glass which comprises one or more dopants which decreases the index of refraction of silica glass such that the index of refraction of the overclad tube is less than the index of refraction of the core cane member. In general, it should be understood that the overclad tube 102 preferably comprises silica glass which has an index of refraction which is less than the index of refraction of at least a portion of the core cane member 110.

In the embodiments described herein, the overclad tube 102 is generally circular in cross section. For example, the overclad tube 102 may by circular in cross section with an inner diameter of about 32 mm and an outer diameter of about 36 mm such that the overclad tube 102 has a thickness of about 2 mm. However, it should be understood that the overclad tube 102 used in conjunction with the methods described herein may have larger or smaller dimensions.

In one embodiment, the overclad tube 102 is tapered to accommodate the tapered portion of the core cane member which, in turn, facilitates drawing the tube assembly 100 into a smaller diameter optical fiber preform or optical fiber. Alternatively, the overclad tube 102 may be initially formed without a taper (i.e., the overclad tube 102 is substantially cylindrical) and subsequently tapered to seal an end of the overclad tube after the core cane member is positioned in the overclad tube.

Still referring to FIG. 1, the rod and tube assembly 100 further comprises glass soot and, more particularly, pelletized glass soot 120. The pelletized glass soot 120, conjunction with the overclad tube 102, may be consolidated in a redraw process into a continuous, substantially void-free glass layer which extends circumferentially around the core cane member 110 thereby forming an overclad portion of an optical fiber or optical fiber preform, as will be described in more detail herein.

In order to form dense, void-free glass from glass soot, it has been determined that the sintering rate must be controlled such that gas or air located in the pores between soot particles escapes from the pores before the pores close. For example, if the sinter rate is too fast, the gas or air disposed in the pores does not escape from the pores before the pores close and becomes trapped thereby forming voids in the consolidated glass. Similarly, when the glass soot is sintered at a rate which is faster than the rate at which the overclad tube is collapsed towards the core cane member, the sintered soot adheres to either the interface with the core cane member or the interface with the overclad tube thereby creating large voids or discontinuities at the other interface.

When the overclad portion of an optical fiber or optical fiber preform is formed by sintering silica glass soot, the size and number of voids present in the sintered glass soot, at the interface between the sintered glass soot and the overclad tube, and at the interface between the sintered glass soot and the core cane member may be substantially mitigated by increasing the sintering time of the glass soot which, in turn, decreases the sintering rate of the glass soot thereby slowing the sintering process. More specifically, it has been determined that the sintering time of glass soot increases with the size of the glass soot particles. Accordingly, by increasing the size of the glass soot particles used to form the overclad portion of the optical fiber, the sintering time of the glass soot is increased which, in turn, lowers the sintering rate of the glass soot. Lowering or slowing the sintering rate of the glass soot allows for gas and/or air to escape from pores in the soot before the pores close. This results in substantially void-free glass and a continuous, substantially void-free interface between the core cane member and the sintered glass soot as well as a continuous, substantially void-free interface between the overclad tube and the sintered glass soot.

For example, considering surface energy driven viscous flow as the dominant mechanism in sintering glass particles, the characteristic time $t_{sinter}$ to sinter glass particles having an average equivalent spherical diameter $D_P$ may be expressed mathematically as:

$$t_{sinter} \geq \frac{2.5 \mu D_P}{\sigma}, \quad (1)$$

where $\mu$ is the viscosity of the silica glass soot particles (in Poise) at the redraw temperature (i.e., the sintering temperature) and $\sigma$ is the surface tension of the silica glass soot particles (in dynes/cm) at the redraw temperature. As used herein, the term "equivalent spherical diameter" refers to the diameter of a sphere having the same equivalent volume as the particle. For example, where the particle is generally cylindrical, the equivalent spherical diameter of the cylindrical particle is the diameter of a sphere having the same volume as the cylindrical particle.

The viscosity $\mu$ of the glass soot is a function of the redraw temperature $T_{redraw}$. For example, when the glass soot is silica glass soot, the viscosity $\mu$ may be expressed as:

$$\mu = \text{Exp}\left(-14.36 + \frac{61991}{T_{redraw}}\right), \quad (2)$$

where $T_{redraw}$ is expressed in Kelvin. However, it should be noted that the specific expression for viscosity may vary depending on the composition of the glass soot. For example, the addition of dopants to the glass soot may change the viscosity of the glass soot.

Similarly, the surface tension σ of the glass soot particles is a function of the redraw temperature $T_{redraw}$. For example, when the glass soot is silica glass soot, the surface tension σ may be expressed as:

$$\sigma = 233.28 + 0.035 T_{redraw} \qquad (3).$$

where $T_{redraw}$ is expressed in Kelvin. However, it should be noted that the specific expression for surface tension may vary depending on the composition of the glass soot. For example, additions of dopants to the glass soot may change the surface tension of the glass soot.

Accordingly, considering Equations 1-3, it should be understood that the sintering time $t_{sinter}$ is a function of both the redraw temperature $T_{redraw}$ and the diameter $D_P$ of the soot particles being sintered. Further, when the glass soot comprises a dopant which increase or decreases the index of refraction of the glass soot, it should be understood that the viscosity μ and the surface tension σ may be increased or decreased and, as such, the size of the average equivalent spherical diameter may be increased or decreased to achieve the desired sintering time $t_{sinter}$. For example, if the viscosity of the soot particles is decreased by a factor of 5 by doping the glass soot, the average equivalent spherical diameter $D_P$ of soot particles should be increased by a factor of 5 to maintain the same sintering time $t_{sinter}$ as the undoped silica glass soot. Accordingly, it should be understood that as the viscosity μ and surface tension σ vary with the composition of the glass soot, the average equivalent spherical diameter $D_P$ of the soot particles may be varied to achieve the desired sintering time $t_{sinter}$.

The redraw process in which the glass soot is sintered and the rod and tube assembly is drawn to a smaller diameter is typically performed at temperatures above the softening point of the glass such that rod and tube assembly can be readily drawn down and the glass soot can be consolidated to form solid glass. For example, a typical redraw process may be performed at temperatures from about 1700° C. to about 2100° C. In the embodiments described herein, the redraw temperature $T_{redraw}$ is preferably greater than about 1700° C., more preferably greater than about 1750° C. and, most preferably, greater than about 1800° C.

In the embodiments described herein, the soot particles have an average equivalent spherical diameter of greater than about 0.3 mm, more preferably greater than about 0.8 mm and, most preferably, greater than about 2.0 mm such that the soot particles are consolidated into fully densified, void-free glass following sintering at the specified redraw temperatures.

Utilizing Equations 1-3, when soot particles having average equivalent diameters $D_P$ in the identified ranges are sintered at the specified redraw temperatures $T_{redraw}$, the sintering time $t_{sinter}$ for forming substantially void-free glass from the glass soot particles is preferably greater than or equal to about 1800 seconds, more preferably greater than or equal to about 3000 seconds and, most preferably, greater than or equal to about 4500 seconds.

Figure 2:
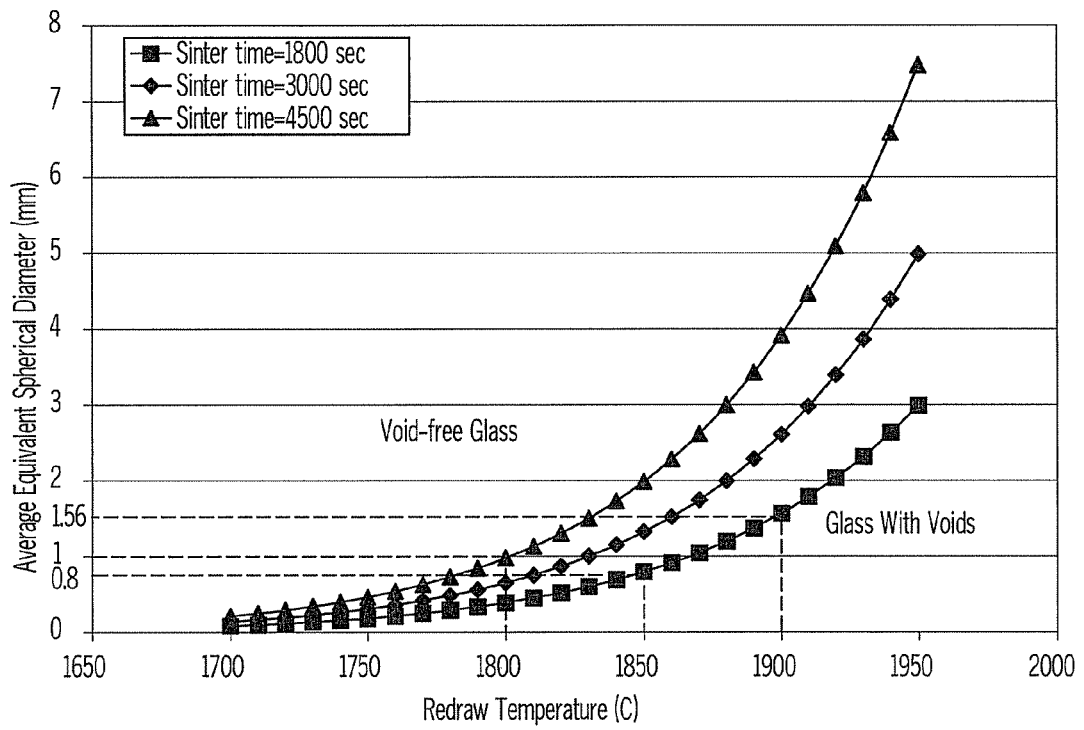
FIG. 2 graphically illustrates the relationship between redraw temperature (x-axis) and particle average equivalent spherical diameter (y-axis) for three different sintering times.

For example, referring now to FIG. 2, a plot indicating the relationship between redraw temperature (x-axis) and particle average equivalent diameter (y-axis) for three different sintering temperatures (i.e., $t_{sinter}$=1800 seconds, 3000 seconds and 4500 seconds) is graphically illustrated. As shown in FIG. 2, for a specified sintering time $t_{sinter}$ and redraw temperature $T_{redraw}$, the soot particles should have a minimum average equivalent spherical diameter in order to produce void-free glass following sintering. For example, for a sintering time $t_{sinter}$ of 4500 seconds and a redraw temperature $T_{redraw}$ of 1800° C., the soot particles should have an average equivalent spherical diameter of at least 1 mm in order to produce void-free glass following sintering. In another example, for a sintering time $t_{sinter}$ of 1800 seconds and a redraw temperature $T_{redraw}$ of 1850° C., the soot particles should have an average equivalent spherical diameter of at least 0.8 mm in order to produce void-free glass following sintering. In yet another example, for a sintering time $t_{sinter}$ of 1800 seconds and a redraw temperature $T_{redraw}$ of 1800° C., the soot particles should have an average equivalent spherical diameter of at least 1 mm in order to produce void-free glass following sintering. If the average equivalent spherical diameter of the particles in each of these examples is less than the specified value, the resultant glass may contain voids following sintering under the specified conditions. However, if the average equivalent spherical diameter of the particles in each of these examples is greater than the specified value, the resultant glass will be substantially void-free following sintering under the specified conditions.

While in the aforementioned examples the average equivalent spherical diameter of the particles is selected based on the redraw temperature and the sintering time, it should be understood that the sintering time may be selected based on the average equivalent spherical diameter of the particles and the redraw temperature. Similarly, the redraw temperature may be selected based on the sintering time and the average equivalent diameter of the particles.

While Equations 1-3 and FIG. 2 are indicative of conditions sufficient for forming substantially void-free glass following sintering, the average equivalent spherical diameter of glass soot is generally much less than 1 mm and usually less than 10 microns. For example, silica glass soot collected from an OVD, MCVD or VAD deposition process may have an average equivalent spherical diameter from about 0.01 micron to about 0.5 micron, more preferably from about 0.03 micron to about 0.25 micron and, most preferably, from about 0.06 micron to about 0.25 micron. Accordingly, in order to use glass soot to produce an overclad portion of an optical fiber which is substantially void-free, the soot must first be pre-processed to increase the average equivalent spherical diameter of the glass soot.

Referring again to FIG. 1, in order to form an overclad portion of an optical fiber according to the methods described herein, the glass soot is first pre-processed to form pelletized glass soot 120 which comprises a plurality of pellets having the desired average equivalent spherical diameter. In the embodiments described herein the average equivalent spherical diameter of the pelletized glass soot is preferably greater than about 0.3 mm, more preferably greater than about 0.8 mm and, most preferably, greater than about 2.0 mm, as described above. Pre-processing the glass soot facilitates achieving these average equivalent spherical diameters from glass soot particles having much smaller average equivalent diameters.

In one embodiment, the glass soot from which the pelletized glass soot is formed may comprise commercially available silica glass soot or silica glass particles. Alternatively, the silica glass soot may be soot recovered from pyrolysis of a chemical vapor deposition operation, e.g., from deposition of octamethyltetrasiloxane during outside vapor deposition (OVD) of an overclad portion of an optical fiber preform or another, similar operation for producing optical fiber preforms (e.g., MCVD, VAD or a similar glass deposition technique).

In one embodiment, the glass soot may comprise pure silica glass soot. By "pure silica glass" we mean that the silica glass soot does not contain any dopants which would increase or decrease the index of refraction of the glass soot, as described above. Alternatively, the silica glass soot may comprise one or more dopants which either increase or decrease the index of refraction of silica glass. For example, when the core cane member 110 comprises silica glass up-doped with one or more dopants which increase the index of refraction of the silica glass, the glass soot used to form the pelletized glass soot 120 may comprise pure silica glass or silica glass which comprises one or more dopants which decrease the index of refraction of silica glass, such as boron, fluorine or a similar dopant which decreases the index of refraction of silica glass, such that the index of refraction of the pelletized glass soot 120 is less than the index of refraction of the core cane member. Alternatively, where the core cane member 110 comprises pure silica glass, as described above, the pelletized glass soot 120 may comprise silica glass which comprises one or more dopants which decreases the index of refraction of silica glass such that the index of refraction of the pelletized glass soot 120 is less than the index of refraction of the core cane member 110. In the embodiments described herein, the silica glass soot from which the pelletized glass soot 120 is formed will generally have an index of refraction which is approximately the same as the index of refraction of the overclad tube 102 which, in turn, comprises silica glass which has an index of refraction which is less than the index of refraction of the core cane member 110, as described above. However, in other embodiments, it should be understood that the index of refraction of the pelletized glass soot 120 may be different than the overclad tube 102.

Various techniques may be used to form the glass soot into pelletized glass soot. For example, in one embodiment, pelletized glass soot is formed by first consolidating the glass soot into a glass body. When the glass soot is silica glass soot, the glass soot may be consolidated by heating the glass soot to a temperature from about 1300° C. to about 1500° C. such that the glass soot is formed into a solid glass body having a density of about 2.2 g/cm$^3$. After the glass soot is formed into a glass body, the glass body may be broken into a plurality of smaller glass soot pellets thereby forming the pelletized glass soot. Thereafter, the pelletized glass soot may be screened to obtain pelletized glass soot comprising pellets of the desired dimensions. For example, in one embodiment, the glass soot pellets may be screened such that all pellets in the pelletized glass soot are less than a specific diameter or have a desired average particle size. Alternatively, the glass soot pellets may be screened such that all the glass soot pellets have substantially the same diameter.

In an alternative embodiment, the pelletized glass soot may be formed by extrusion. For example, the glass soot may first be mixed with a binder to form a soot paste. In one embodiment, the binder is METHOCEL™ available from The Dow Chemical Company. The METHOCEL™ is mixed with the glass soot in amount of 5% by weight along with 25% water to form the soot paste. However, it should be understood that other binders may be used to form the soot paste including, without limitation, polyvinyl alcohol (PVA) or similar binders. Further, it should also be understood that the paste may be formed with liquids other than water.

The soot paste is extruded through a die to form a soot extrusion. For example, in one embodiment, the soot paste is extruded through a cylindrical or circular die such that the resulting soot extrusion or soot extrusions are circular in cross section with a diameter of 2 mm. Thereafter, the soot extrusion is separated into a plurality of glass soot pellets which, in this example, have a axial length of at least 2 mm. While this specific example recites glass soot pellets which are 2 mm in diameter and 2 mm in length, it should be understood that the diameter of the cylindrical die may be larger or smaller such that the cross sectional diameter of the pellets is larger or smaller than 2 mm. It should also be understood that the soot extrusion may be sectioned into larger or smaller axial lengths depending on the desired final dimensions of the soot pellets. Further, while this example describes a die with a circular cross section, it should be understood that the die may have various other cross sectional shapes.

After the soot extrusion has been separated into glass soot pellets thereby forming pelletized glass soot, the pelletized glass soot may be dried to remove water, impurities and/or organic materials. This drying process may be performed at elevated temperatures in a controlled atmosphere. For example, the pelletized soot may be dried at 500° C. in oxygen for 15 minutes. Thereafter, the pelletized soot may be dried at 1000° C. in an atmosphere comprising 95% helium and 5% chlorine followed by a purge at 1000° C. in 100% helium. However, it should be understood that this drying schedule is exemplary and that other drying schedules may be used to dry the pelletized soot.

While two exemplary techniques for forming pelletized glass soot from glass soot have been described herein, it should be understood that pelletized glass soot formed by other techniques may also be utilized in conjunction with the methods for forming an overclad portion of an optical fiber preform described herein.

Referring again to FIG. 1, to form the rod and tube assembly 100 the core cane member 110 is initially positioned in the overclad tube 102 such that the core cane member 110 and the overclad tube 102 are substantially coaxial. In embodiments where the overclad tube 102 initially comprises a tapered end, the core cane member 110 may be positioned such that the tapered end of the core cane member 110 is seated within the tapered end of the overclad tube 102. Alternatively, the core cane member 110 may be initially positioned in the overclad tube 102 and the end of the overclad tube may be heated and collapsed around the tapered end of the core cane member 110. Thereafter, the pelletized glass soot 120 is positioned in the overclad tube 102 between the core cane member 110 and an interior sidewall 104 of the overclad tube 102.

Figure 4:
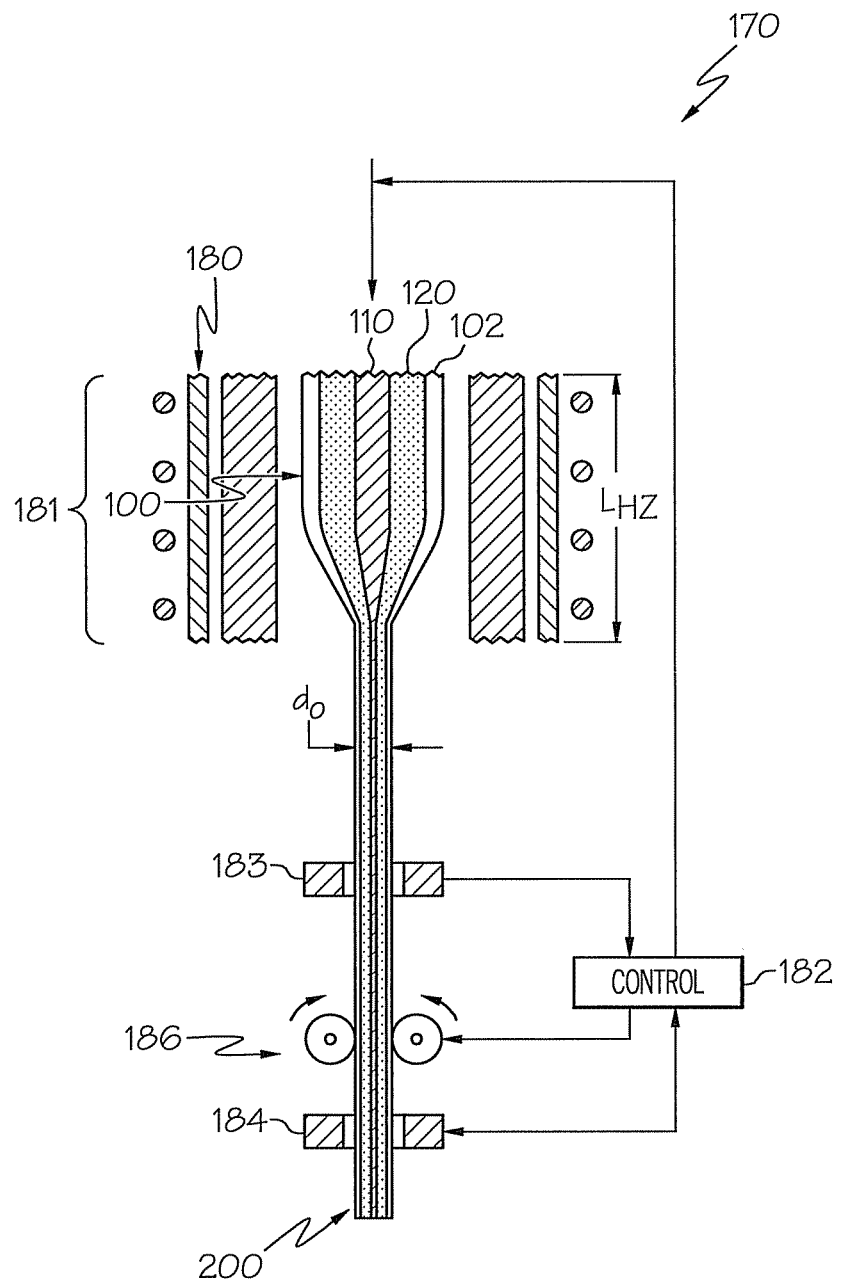
FIG. 4 depicts a redraw process for consolidating the rod and tube assembly of FIG. 1 into an optical fiber preform according to one or more embodiments shown and described herein.

Referring now to FIG. 4, to consolidate the rod and tube assembly 100 and thereby form the pelletized glass soot 120 and overclad tube 102 into a continuous layer of void free glass surrounding the core cane member 110, the rod and tube assembly 100 is positioned in a redraw apparatus 170. The redraw apparatus generally comprises a draw furnace 180 comprising a hot zone 181, a tensioning mechanism 186, and a control system 182. In general, the redraw apparatus 170 operates in the following manner. A rod and tube assembly 100 is positioned in the draw furnace 180 where it is advanced through the hot zone 181 with a rod and tube feed mechanism (not shown) at a specified down draw rate such that the rod and tube assembly is heated to a temperature above the softening point of the glass. In the embodiments described herein, the redraw temperature is generally from about 1700° C. to about 2100° C. The heated and softened glass is then drawn down with the tensioning mechanism 186, which applies a tension to the heated and softened glass thereby decreasing the diameter of the glass and, in this example, forming the rod and tube assembly 100 into a preform 200 having the desired diameter. One or more non-contact sensors 183, 184 may be used to monitor the speed and/or diameter of the drawn glass. The non-contact sensors 183, 184 may be electronically coupled to the control system 182 which, in turn is coupled to the tensioning mechanism 186 and the rod and tube feed mechanism. Based on signals received from the non-contact sensors 183, 184, the control system 182 is operable to increase or decrease the rate at which the rod and tube assembly 100 is advanced through the hot zone 181 of the draw furnace 180 and/or the amount of tension applied to the heated and softened glass with the tensioning mechanism 186 thereby controlling the amount by which the rod and tube assembly 100 is drawn down and, as such, the diameter of the optical fiber preform 200.

In the embodiments described herein, the operating parameters (i.e., the temperature of the hot zone and the rate at which the rod and tube assembly 100 is advanced through the hot zone 181 of the draw furnace 180) of the redraw apparatus 170 may be selected based on the average equivalent spherical diameter of the pelletized glass soot and at least one of the sintering time or the redraw temperature utilizing the relationships defined in Equations 1-3 and graphically depicted in FIG. 2. For example, the rod and tube assembly 100 may comprise pelletized glass soot 120 which has an average equivalent spherical diameter $D_P$ of 2.0 mm. Utilizing the relationship graphically depicted in FIG. 2, the appropriate redraw apparatus operating parameters may be selected to facilitate sintering the pelletized glass soot 120 such that the pelletized glass soot and the overclad tube 102 form a continuous layer of substantially void-free glass around the core cane member. For example, if the sintering time is selected to be 1800 seconds, the redraw temperature should be at least about 1925° C.; if the sintering time is selected to be 3000 seconds, the redraw temperature should be at least about 1875° C.; and, if the sintering time is selected to be 4500 seconds, the redraw temperature should be at least about 1850° C.

Once the sintering time and redraw temperature are selected, the specific down draw rate of the rod and tube assembly 100 may be determined based on the selected sintering time. For example, the residence time of the rod and tube assembly in the hot zone 181 of the draw furnace should be at least as long as the sintering time at the selected redraw temperature to facilitate sintering the pelletized glass soot 120 and the overclad tube 102 into substantially void-free glass. The minimum residence time in the hot zone of the draw furnace may be calculated by dividing the length of the hot zone $L_{HZ}$ by the traverse rate of the rod and tube assembly through the hot zone. For example, in the embodiments described herein, the draw furnace 180 has a hot zone 181 with a length $L_{HZ}$ of approximately 304 mm (i.e., approximately 1 foot). A typical draw rate for a rod and tube assembly is about 5.6 mm/min which corresponds to a hot zone residence time of greater than about 3200 seconds. Accordingly, for sintering times $t_{sinter}$ of dr 3000 seconds or less, a down draw rate of about 5.6 mm/min yields sufficient residence time in the hot zone 181 of the draw furnace to produce the desired substantially void-free glass following sintering at the specified redraw temperature. For example, as noted above, when the average equivalent spherical diameter of the pelletized glass soot 120 is about 2.0 mm, sintering times of 1800 seconds and 3000 seconds may be used in conjunction with redraw temperatures of 1925° C. and 1875° C., respectively. In either case, a down draw rate of 5.6 mm/min yields sufficient time in the hot zone 181 of the draw furnace to sinter the pelletized glass soot 120 and overclad tube 102 into a substantially continuous layer of glass surrounding the core cane member 110.

When the temperature of the hot zone 181 is non-uniform, such as when there is one or more temperature gradients through the hot zone 181, the effective ratio of the viscosity to surface tension over the length of the hot zone $L_{HZ}$ is determined by discretizing the hot zone into N elements and averaging over these elements, such that:

$$\left(\frac{\mu}{\sigma}\right)_{effective} = \frac{\sum_{i=1}^{N}(\mu/\sigma)_i}{N}. \tag{4}$$

Based on Equation (4), Equation (1) may be rewritten as:

$$t_{sinter} \geq 2.5 D_P \left(\frac{\mu}{\sigma}\right)_{effective} \tag{5}$$

when the temperature of the hot zone 181 of the draw furnace is non-uniform.

Once the redraw apparatus operating parameters have been determined, the hot zone 181 of the draw furnace 180 is heated to the selected redraw temperature. Thereafter, the rod and tube assembly 100 is positioned in the draw furnace 180 and advanced through the hot zone 181 of the draw furnace 180 at the determined down draw rate such that the rod and tube assembly 100 is resident in the hot zone 181 for a period of time which is greater than or equal to the selected sinter time. As the rod and tube assembly 100 is heated and softened, the tensioning mechanism draws the rod and tube assembly to a smaller diameter which, in this example, is the diameter of an optical fiber preform 200 from which optical fiber may be subsequently drawn.

Figure 3:
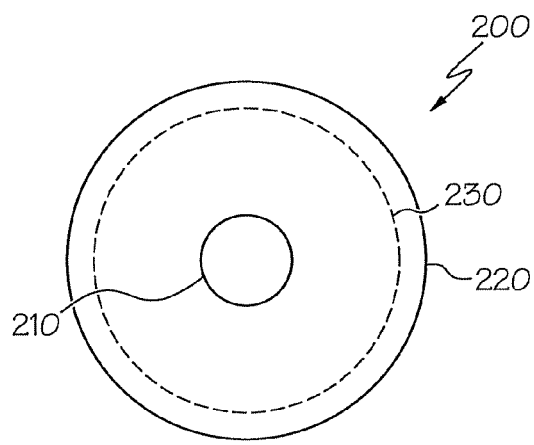
FIG. 3 depicts a cross section of an optical fiber preform formed according to one or more embodiments shown and described herein.

Referring now to FIGS. 1 and 3, a cross section of one embodiment of an optical fiber preform 200 formed according to the methods described herein is schematically illustrated. As shown in FIG. 3, the optical fiber preform 200 generally comprises a core portion 210 which generally corresponds to the core cane member 110 of the rod and tube assembly 100 and an overclad portion 220 which generally corresponds to the pelletized glass soot 120 and the overclad tube 102 of the rod and tube assembly 100. Using the methods described herein, the overclad tube 102 and the pelletized glass soot 120 have been formed into the overclad portion 220 which comprises a continuous, substantially void-free layer of glass which surrounds core portion 210. The interface between the overclad tube 102 and the pelletized glass soot 120 is schematically illustrated with dashed line 230. However, this interface between the overclad tube 102 and the pelletized glass soot is continuous and substantially free from voids or any other discontinuities. Further, the interface between the core portion 210 and the overclad portion 220 is continuous and substantially free from voids or any other discontinuities. The phrases "substantially void-free" or substantially free from voids," as used herein, means that the glass does not contain voids in an amount which would change the index or refraction of the glass.

While FIGS. 3 and 4 depict the rod and tube assembly 100 as being redrawn to an optical fiber preform 200 which may be subsequently drawn into optical fiber, it should be understood that, in other embodiments, the rod and tube assembly may be drawn directly into optical fiber.

It should now be understood that the techniques described herein may be used to form an overclad portion of an optical fiber from glass soot by preprocessing the glass soot to increase the particle size and thereby decreasing the sintering rate for forming the glass soot into glass. By decreasing the sintering rate, any gasses or air located in the pores of the pelletized glass soot is able to escape prior to the pores closing. As a result, the sintered glass is substantially void-free.

The techniques described herein may be used in conjunction with recycled or reclaimed glass soot from OVD, MCVD and VAD deposition processes and, therefore, may reduce overall manufacturing costs for making the overclad portion of an optical fiber preform. However, it should be understood that the methods described herein may be used with commercially available glass soot.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of forming an overclad portion of an optical fiber comprising:
    forming a pelletized glass soot containing rod and tube assembly by positioning a core cane member in an overclad tube and positioning pelletized glass soot between the core cane member and an interior sidewall of the overclad tube, the pelletized glass soot comprising pellets having an average equivalent spherical diameter $D_P$ of at least 2.0 mm and formed from glass soot particles bound with a binder; and
    redrawing the pelletized glass soot containing rod and tube assembly under conditions effective to form the overclad tube and the pelletized glass soot into a glass layer surrounding the core cane member at a sintering time $t_{sinter}$ of at least 1800 seconds thereby forming an overclad portion of an optical fiber; and wherein the rod and tube assembly comprises gas or air in pores between pelletized glass soot and is redrawn at a redraw temperature $T_{redraw}$, that is above the softening point of the pelletized glass soot, and wherein the average equivalent spherical diameter $D_P$, the sintering time $t_{sinter}$, and the redraw temperature $T_{redraw}$ satisfy the equation:

$$t_{sinter} \geq \frac{2.5\mu D_P}{\sigma},$$

wherein:
    $\mu$ is a viscosity of the pelletized glass soot as a function of the redraw temperature $T_{redraw}$; and
    $\sigma$ is a surface tension of the pelletized glass soot as a function of the redraw temperature $T_{redraw}$; and wherein a sintering rate of the pelletized glass soot containing rod and tube assembly is controlled based on the rate of escape of the gas or air in pores between pelletized glass soot before closure of the pores.

2. The method of claim 1 wherein the rod and tube assembly is redrawn at a redraw temperature $T_{redraw}$ of at least 1700° C.

3. The method of claim 1 wherein:
    the pelletized glass soot comprises silica glass;
    the viscosity $\mu$ of the silica glass is $$\mu = \text{Exp}\left(-14.36 + \frac{61991}{T_{redraw}}\right);$$

and
    the surface tension $\sigma$ of the silica glass is $\sigma = 233.28 + 0.035 T_{redraw}$.

4. The method of claim 1 wherein the rod and tube assembly is redrawn to form an optical fiber preform.

5. The method of claim 4 wherein the optical fiber preform is redrawn to form optical fiber.

6. The method of claim 1 wherein the glass soot particles comprise recycled silica glass soot.

7. The method of claim 1 further comprising forming the pelletized glass soot prior to positioning the pelletized glass soot in the rod and tube assembly.

8. The method of claim 7 wherein the pelletized glass soot is formed by:
    mixing the glass soot particles with the binder to form a soot paste;
    extruding the soot paste to form a soot extrusion; and
    separating the soot extrusion into a plurality of pellets.

9. The method of claim 1 wherein the glass layer is a continuous, substantially void-free glass layer.

10. A method of forming an overclad portion of an optical fiber comprising:
    forming a pelletized glass soot containing rod and tube assembly by positioning a core cane member in an overclad tube and positioning pelletized glass soot between the core cane member and an interior sidewall of the overclad tube, wherein the pelletized glass soot comprises pellets with an average equivalent spherical diameter $D_P$ of at least 2.0 mm and formed from glass soot particles bound with a binder, wherein the rod and tube assembly comprises gas or air in pores between pelletized glass soot; and
    redrawing the pelletized glass soot containing rod and tube assembly at a sintering time $t_{sinter}$ of at least 1800 seconds at a redraw temperature $T_{redraw}$ of at least 1700° C. such that the overclad tube and the pelletized glass soot form a continuous, void-free glass layer surrounding the core cane member; and wherein the average equivalent spherical diameter $D_P$, the sintering time $t_{sinter}$, and the redraw temperature $T_{redraw}$ satisfy the equation:

$$t_{sinter} \geq \frac{2.5\mu D_P}{\sigma},$$

wherein:
    $\mu$ is a viscosity of the pelletized glass soot as a function of the redraw temperature $T_{redraw}$; and
    $\sigma$ is a surface tension of the pelletized glass soot as a function of the redraw temperature $T_{redraw}$; and wherein a sintering rate of the pelletized glass soot containing rod and tube assembly is controlled based on the rate of escape of the gas or air in pores between pelletized glass soot before closure of the pores.

11. The method of claim 10 wherein:
    the pelletized glass soot comprises silica glass;
    the viscosity $\mu$ of the silica glass is $$\mu = \text{Exp}\left(-14.36 + \frac{61991}{T_{redraw}}\right);$$

and
    the surface tension $\sigma$ of the silica glass is $\sigma = 233.28 + 0.035 T_{redraw}$.

12. The method of claim 10 wherein the rod and tube assembly is redrawn into an optical fiber preform.

13. The method of claim 10 wherein the rod and tube assembly is redrawn into optical fiber.

14. The method of claim 10 wherein the pelletized glass soot comprises pellets formed from extruded glass soot, pellets formed from consolidated glass soot or combinations thereof.

* * * * *